(12) United States Patent
Gramss et al.

(10) Patent No.: US 7,377,559 B2
(45) Date of Patent: May 27, 2008

(54) LOCKING SYSTEM FOR A FUEL DOOR HOUSING

(75) Inventors: Rainer Gramss, Iserlohn (DE); Carsten Albracht, Menden (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 277 days.

(21) Appl. No.: 11/145,953

(22) Filed: Jun. 7, 2005

(65) Prior Publication Data

US 2006/0016814 A1 Jan. 26, 2006

(30) Foreign Application Priority Data

Jul. 20, 2004 (DE) .................... 10 2004 035 013

(51) Int. Cl.
  *E05C 1/08* (2006.01)
  *B65D 47/02* (2006.01)
(52) U.S. Cl. ............... 292/163; 292/137; 292/150; 292/302; 292/DIG. 4; 292/DIG. 61; 220/4.14; 220/86.2; 220/211; 220/830; 296/97.22
(58) Field of Classification Search .......... 292/137, 292/144, 150, 152, 163, 172, 175, 302, 303, 292/DIG. 4, DIG. 11, DIG. 61, DIG. 37; 220/4.14, 86.2, 211, 830; 296/97.22
  See application file for complete search history.

(56) References Cited

U.S. PATENT DOCUMENTS 3,915,491 A * 10/1975 Montgomery ............ 296/97.22
4,179,143 A * 12/1979 Shy ............................ 292/179
4,811,763 A * 3/1989 Kupske ........................ 141/44
5,238,138 A * 8/1993 Bois ............................ 220/830
5,580,258 A * 12/1996 Wakata ........................ 439/142
6,607,224 B2 * 8/2003 Hodges ........................ 292/303
6,702,357 B2 * 3/2004 Joerg et al. .............. 296/97.22
6,786,353 B2 * 9/2004 Gourand ...................... 220/835
7,185,938 B2 * 3/2007 Beck ........................ 296/97.22

FOREIGN PATENT DOCUMENTS

| DE | 197-11-331 A1 | 9/1998 |
| DE | 197 47 707 A1 | 5/1999 |
| DE | 101 37 035 | 2/2003 |
| DE | 203 11 149 | 11/2003 |
| DE | 203 11 149 U1 | 11/2003 |
| EP | 0 846 585 A2 | 6/1998 |
| EP | 1 281 558 A2 | 2/2003 |
| GB | 2 149 447 A | 6/1985 |
| WO | 2004/041575 A1 | 5/2004 |

* cited by examiner

*Primary Examiner*—Carlos Lugo

(57) ABSTRACT

The tank flap of an automobile is locked via a wire spring with which an extension connected to the tank flap will cooperate. A spring-biased locking body keeps the wire spring in the releasing position when the tank flap initially is forced inwards.

19 Claims, 4 Drawing Sheets

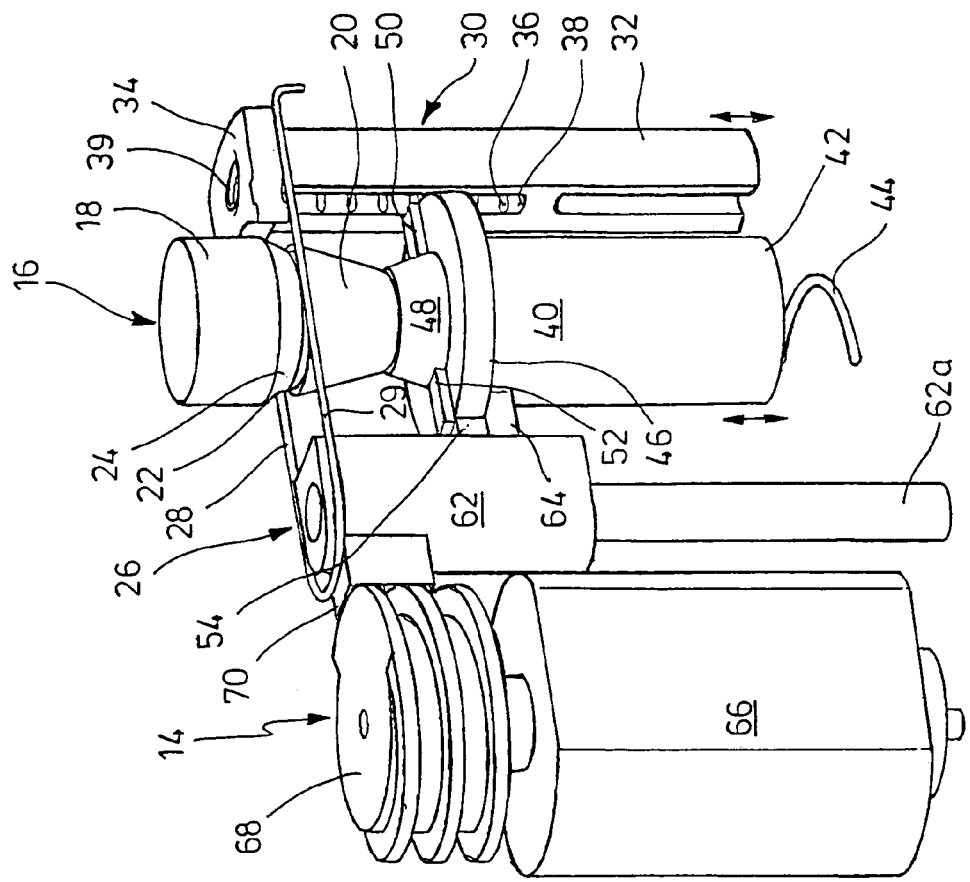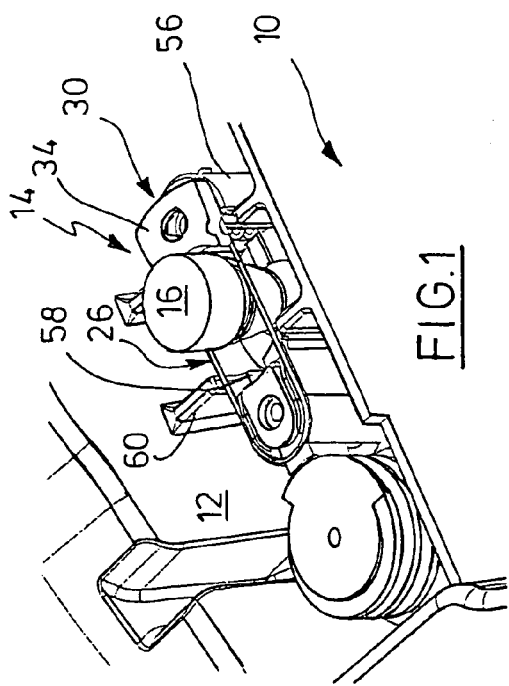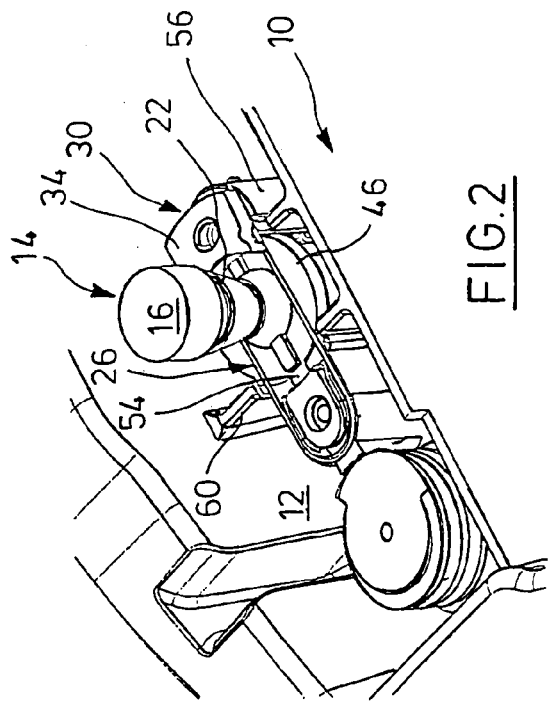

LOCKING SYSTEM FOR A FUEL DOOR HOUSING

RELATED APPLICATIONS

The present application is based on, and claims priority from, German Application Number 10 2004 035013.2, filed Jul. 20, 2004, the disclosure of which is hereby incorporated by reference herein in its entirety.

FIELD OF THE INVENTION

This invention relates to a locking system for a fuel door housing.

BACKGROUND OF TH INVENTION

A fuel door housing has become known from DE 203 11 149 U1, for example. It comprises a single-piece cup shaped body which is inserted into a through aperture in the body of a vehicle. The cup shaped body pivotally supports a tank flap which, at its inside, has an arresting shoulder which interacts with a closing element of a closing device. The closing device may be driven via a central power door lock control. The closing device is housed in a separate compartment of the cup shaped body.

SUMMARY OF THE INVENTION

It is the object of the invention to provide a locking system for a fuel door housing in which the tank flap can be automatically locked by closing it from the opened position, and in which the tank flap is automatically unlocked by applying a pressure thereto while the flap is being swung out through a certain angle and, finally, in which the unlocked position of the locking device is lockable.

In the inventive locking system, a locking projection which has a lateral locking recess is arranged at the inside of the tank flap. The locking recess interacts with a spring leg mounted on one side, e.g. a spring wire, on the cup shaped body. The spring leg may be resiliently movable between a locking position and a releasing position. It will engage the locking recess when it is in a locking position. This is the case when the tank flap is in its closed position. The spring leg is mounted in such a way here as to automatically snap into the locking recess when the tank flap is moved to the closed position.

Furthermore, the cup shaped body has disposed therein an ejector body which is guided along an axis which points to the same direction as the axis of the locking projection with the ejector body being movable between an outer and an inner position. If the terms "inner" and "outer" are spoken of above and below they refer to the position in which the fuel door housing is mounted in the vehicle. The tank flap, when in a closed position, is in the same plane as the adjoining outer surfaces of the automobile body. Therefore, the term "inner" suggest that the part concerned is farther inward with respect to the outer shell of the body.

The ejector body is biased by a first biasing spring, namely to the outer position. Therefore, the ejector body attempts to move the locking projection to the outside, but is prevented for a time as long as the spring leg is seated in the locking recess. When the spring leg is moved out of the locking recess the ejector body, while being driven by its biasing spring, will be able to move the locking projection to the outside, thus swinging out the tank flap through a certain angle.

To allow the automobile user to easily open the tank flap, the invention further provides an oblique deflection surface in the area of the locking recess by which the spring leg is deflected sidewards when the locking projection is moved inwardly against the first biasing spring. This causes the spring leg to be swung to its releasing position. However, care should be taken to maintain the spring leg in the releasing position because otherwise it would snap back automatically into the locking recess after the locking projection has moved to the outside. Therefore, the invention provides a locking body which is movably supported in the cup shaped body in parallel with the axis of the ejector body between an outer and an inner position and is biased by a second spring against an abutment of the cup shaped body, the direction of bias being from the outside to the inside. The locking body has a lateral shoulder which is disposed between the spring leg and the tank flap when the tank flap is in the closed position. The second biasing spring attempts to move the locking body from the outside to the inside, but is prevented from doing so by the spring leg. However, if the leg is swung out sidewards in the above-described manner it becomes possible to move the locking body via the second biasing spring from the outside to the inside, which causes the lateral shoulder to come to lie at the level of the spring leg. This way holds the spring leg in its releasing position and the ejector body can move the locking projection and, hence, the tank flap outwardly. During this procedure, a driver portion of the ejector body grasps the locking body and again moves it outwardly against the second biasing spring. As a result, the lateral shoulder releases the spring leg again and the spring leg can maintain the lateral shoulder between the spring leg and tank lid in a biased position for a next actuation.

If the tank lid is swung back to the completely closed position from the open one the locking projection should be given such a shape that the spring leg readily snaps into the locking recess. However, this deflection of the spring leg is insufficient to release the locking body or its lateral shoulder. This will not happen until the locking projection is forced inwards, swinging the spring leg to such an extent that the lateral shoulder is released and the locking body can be swung inwardly against an inner stop.

The inventive locking system needs little constructional space in the fuel door housing and requires a relatively small number of individual components. According to a preferred aspect of the invention, the locking recess is formed by an annular groove and the deflection surface is formed by an oblique wall of the annular groove. The spring leg is a leg of a U-shaped wire spring the two spring legs of which preferably are approximately parallel while they engage the locking recess or annular groove.

According to another aspect of the invention, the spring leg or U-shaped wire spring can be attached to the inside of a lid by which the compartment which accommodates the described components of the locking system can be closed from the outside. For a pre-assembly, the locking body is pre-mounted on the lid by arranging the outer shoulder between the spring legs and the lid. The spring accommodated in the locking body is supported on the lid here and urges the extension against the upper side of the spring legs. The remaining components are introduced in the compartment of the cup shaped body that was opened before, and are fixed in an appropriate fashion.

If the tank lid is intended to be opened only if the power door locks produce an opening signal a locking mechanism should be provided for the ejector body such as to prevent the ejector body from being forced inwardly against its biasing spring from the tank lid. According to an aspect of the invention, the purpose is served by a locking element which is guided in a guide of the cup shaped body and is actuated by an electric motor via transmission means to shift the locking element to the locking position or unlocking position.

BRIEF DESCRIPTION OF THE DRAWING

Embodiments of the invention will be described below with reference to the drawings.

FIG. 1 shows how to install an inventive locking system in cup shaped body as viewed in a perspective outline.

FIG. 2 shows a representation similar to FIG. 1, but with the tank flap unlocked.

FIG. 3 shows a perspective view of the locking system of FIGS. 1 and 2 in a removed condition.

DETAILED DESCRIPTION OF THE INVENTION

Figure 4:
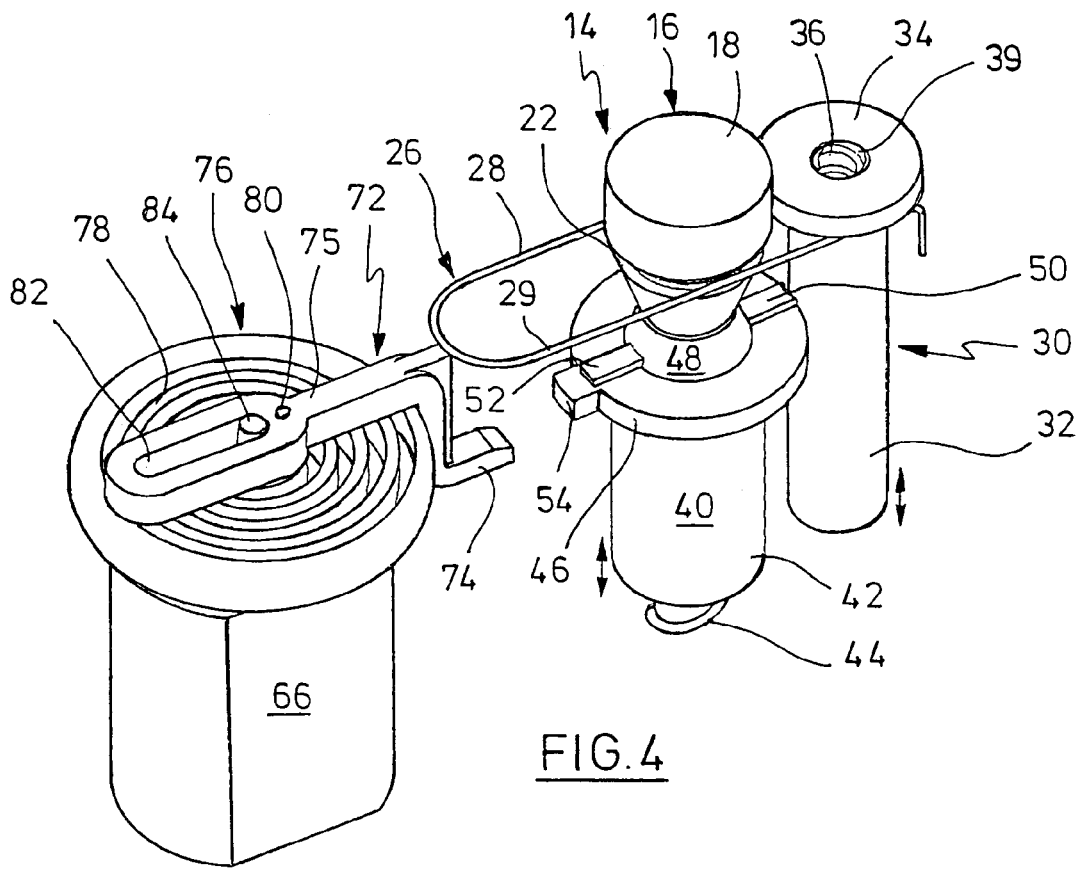
FIG. 4 shows a modified embodiment of an inventive locking system.

In FIGS. 1 and 2, a cup shaped body is formed at 10 as it has become known in its fundamental structure from DE 203 11 149, for example. The body is a single-piece body of a plastic material which has an opening at the bottom to introduce a gas filling nozzle. The cup shaped body 10 points to a separate compartment 12 which is severed by lateral walls from the remaining cavity of the cup shaped body.

The compartment 12 accommodates a locking system 14 which is shown individually in FIG. 3.

In FIG. 3, a locking projection 16 can be seen which has an outer conical portion 18 and an inner conical portion 20. If the speech is about "inner" and "outer" it refers to the position with regard to the outer shell of the body of the vehicle that is not illustrated here. As is known the cup shaped body is introduced in an opening of the outer body shell. Therefore, the open side of the compartment 12 that is shown in FIGS. 1 and 2 faces the outside.

An annular groove 22 the upper groove wall 24 of which is configured as an oblique surface is formed between the portions 18, 20. Via the cylindrical portion 18, the locking projection 16 is connected to the inside of a tank flap which is hinged to the cup shaped body. This is not illustrated. Reference is made here to the German Utility Model which was repeatedly mentioned already.

In FIG. 3, a U-shaped wire spring 26 can be recognized which has two spring legs 28, 29. As can be appreciated from FIG. 3 the spring legs 28, 29 engage the annular groove 22. The spring legs 28, 29 run approximately in parallel when in this position. The spring legs 28, 29, which are manufactured from a suitable spring wire circular in cross-section, extend to the right across the locking projection 16 in FIG. 3. A locking body 30 can be seen there and has an elongate sleeve portion 32 and an upper radial flange 34. As can be appreciated the flange 34 is located above the spring legs 28, 29 which prevent the locking body 30 from being moved downwards. The sleeve-shaped portion 32 has disposed therein a biasing spring 36 which is supported by a portion 38 and extends upwards through an opening 39 in the flange 34.

An ejector body 16 is arranged below the locking projection 16. It has a sleeve-shaped portion 42 which accommodates a biasing spring 44 which is supported by the bottom (not shown) of the compartment 12 (FIGS. 1 and 2). In its upper area, the ejector body has a radial flange 46 the diameter of which is larger than that of the sleeve portion 42. The flange 46 has centrally disposed thereon an axial conical extension 48. Ribs 50, 52 are located on opposed sides of the flange 46 at the upper side thereof. An extension 54 is provided as projecting radially from the flange 46.

The U-shaped spring 26 is attached to a lid for the compartment 12. More reference to this fact will be made below. The sleeve-shaped portion 32 of the locking body 30 is axially guided in a cylindrical guide 56 in the compartment 12. An appropriate guide in the compartment 12 is also provided for the cylindrical portion or sleeve portion 42 of the ejector body 40. The radial extension 54 is guided in a guiding slot 58 of a wall 60 in the compartment 12 (also see FIG. 1 here).

FIG. 3 shows the locked position of the tank flap which is not shown. If a pressure is applied to the tank flap from outside to inside the locking projection 16 will move inwardly while carrying along the ejector body 40 against the biasing force of the spring 44. At this point, the oblique groove surface 24 expands apart the spring legs 28, 29, namely to an extent that allows the radial flange 34 of the locking body 30 to be moved downwards because of the force of its biasing spring 36. The biasing spring 36 is supported by the above-mentioned lid which closes the compartment 12 towards the outside. This causes the flange 34 to get to the level of the spring legs 28, 29. It is understood that the locking body, while moving inwardly as described, is limited in the compartment 12 via a stop which is not shown. As a result, the flange 34 keeps the spring legs 28, 29 expanded and the ejector body 40 is now capable of moving upwards, thus swinging open the tank lid by a certain amount.

While the ejector body 40 is moving outwardly as described it finally strikes against the inside of the lid (not shown) that faces it. At this stage, the rib 50 grips under the flange 34 so as to carry along the locking body 30 upwards to the position shown in FIG. 3 in which the upper surface of the flange 34 bears against the inside of the lid. When the tank lid is closed again the conical portion 12 gets between the spring legs 28, 29 again, straddling them apart a little bit, but not to such an extent that the locking body 30 could be moved down. This movement is continued for a time until the spring legs 28, 29 snap into the annular groove 22.

The design of the locking system 14 is identical in all embodiments which now follow. This is why reference is no longer made to the locking system. By the way, those components of the locking system 14 which are shown there are given the same reference numbers as the locking system of FIGS. 1 to 3.

In FIGS. 1 through 10, different driving options for locking the ejector body 40 are illustrated. In FIG. 3, a locking element 62 can be seen which is movably guided along a bar-shaped guide 62a. The guide extends in parallel with the axis of the locking body 30 and ejector body 40. The locking element 62 has a lateral shoulder 64 which grips under the radial extension 54 and flange 46 in FIG. 3. Hence, it is impossible to move the ejector body 40 downwards via the locking projection 16, thus unlocking the tank flap. An electric motor 66 drives a worm gear 68 which cooperates with a stationary worm portion 70. When the worm gear 68 rotates it causes the locking element 62 of FIG. 3 to be moved upwards or downwards. Unlocking the ejector body 40 requires that the locking element 62 be displaced downwardly. Such a displacement can be initiated by power door locks of the automobile, for example. Not until the ejector body 40 is released the tank flap can be unlocked as described above.

In a variation from FIG. 3, the embodiment of FIG. 4 provides for a Z-shaped locking element 72 which has a locking portion 74 which, when in the locked position, grasps beneath the extension 54 to prevent the ejector body 40 of FIG. 4 from moving downwards. The other leg of the locking element 72 extends above a transmission gear 76 which has a spiral groove 78. The portion 75 of the locking element 72 has inserted therein a pin 80 which engages the groove 78. At that end of the portion 75 which is left-hand in FIG. 4, a guiding slot 82 is provided which is engaged by an extended portion 84 of the shaft of the electric motor 66. Depending on the sense of rotation of the electric motor 66, the locking element 72 is radially moved towards the ejector body 40 or away therefrom because the pin 80 has engaged the groove 78. The embodiment of FIG. 6 differs from that of FIGS. 4 and 5 in that the transmission gear 76 is not seated on the shaft of the electric motor 66, but is driven by a pinion 86 which interengages with teeth on the outer circumference of the transmission gear 76. The transmission disk 76 is rotatably supported by an axle 88 which engages the slot 82 of the portion 75 of the locking element 72. This creates a guide for the movement of the locking element 72. The advantage of the embodiment of FIG. 6 over that of FIG. 4 is that the spiral groove 78 may have a pitch which is significantly larger than that of the groove 78 because a gear ratio reduction takes place for the rotation of the electric motor 66.

Figure 5:
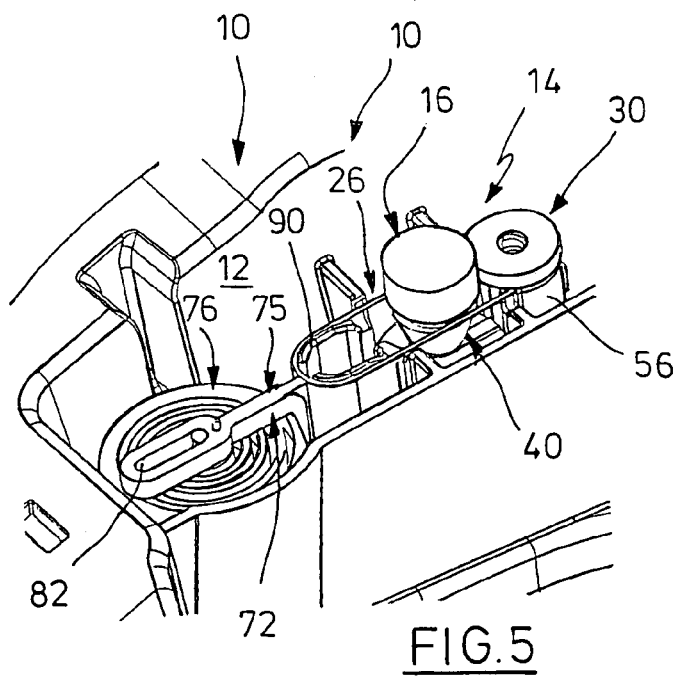
FIG. 5 shows the installation of the locking system of FIG. 4 in a cup shaped body comparable to the assembly of FIGS. 1 and 2.
Figure 6:
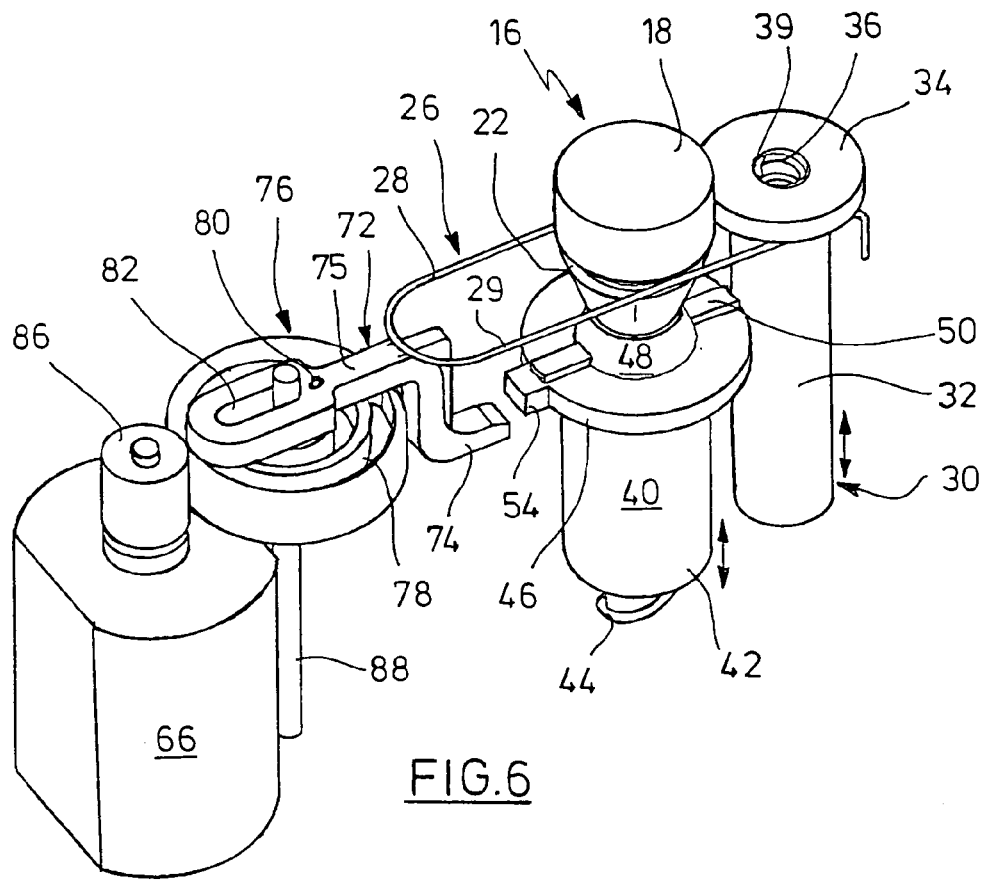
FIG. 6 shows a perspective view of a third embodiment of a locking system according to the invention.

As ensues from FIG. 5, the installation of the electric motor and locking element 72 in the compartment 12 is equal to the installation of the embodiment of FIG. 4. FIG. 5 allows to deduce that a radial movement of the locking element 72 is guided in a slot 90 inside the compartment 72 that is formed in a respective wall. In the embodiment of FIGS. 1 through 3, the locking element 62 is guided by the wall 90. It is understood that the guide for the locking element of FIGS. 4 and 6 may also be configured in a different manner in the compartment 12.

Figure 7:
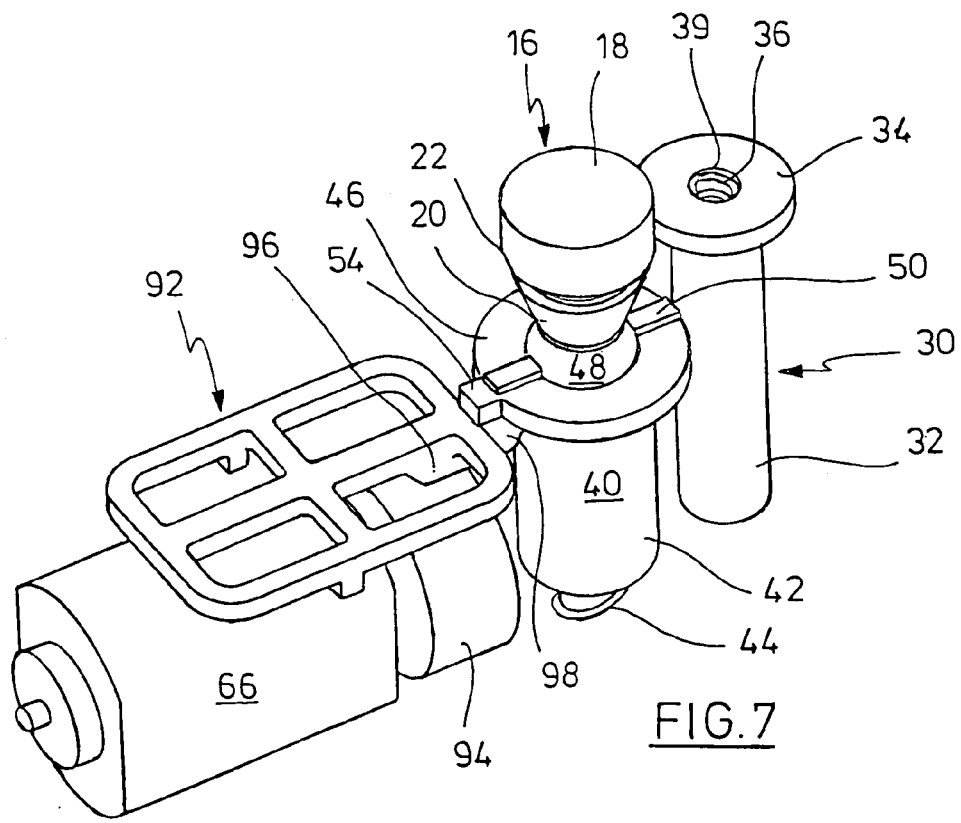
FIG. 7 shows a perspective view of a fourth embodiment of a locking system according to the invention.
Figure 8:
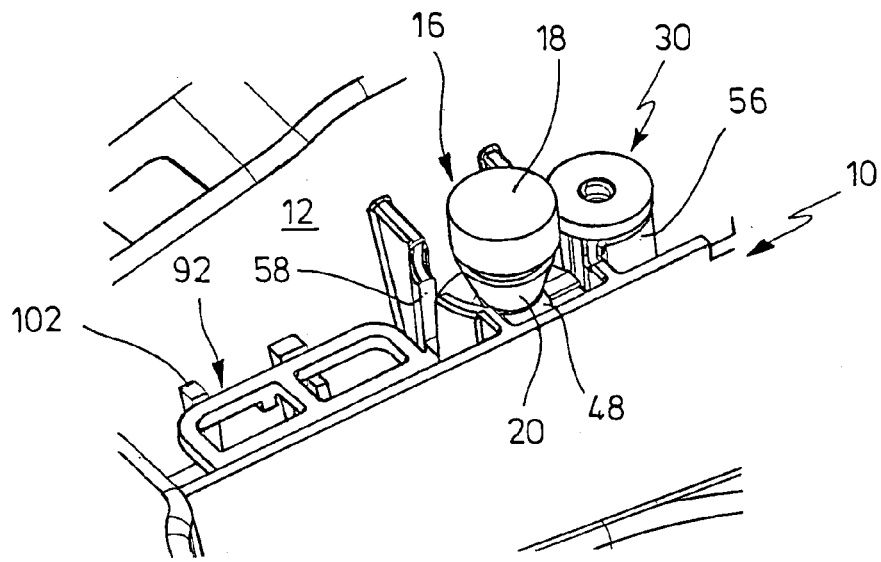
FIG. 8 shows how to install the locking system of FIG. 7 in a cup shaped body.

While the axis of rotation of the electric motor 66 extends in parallel with the axes of the locking body 30 and ejector body 40 in the previously described Figures the axis of the electric motor 66 of FIG. 7 extends transversely thereto. A frame-like locking element 92 is located above the electric motor 66, which drives a transmission gear 94 which has a screw thread at its circumference. At its lower side which is right-hand in FIG. 7, the locking element 92 has a transmission portion 96 of a complementary thread configuration. Therefore, when the transmission gear 94 rotates the locking element 92 is moved towards the ejector body 40 or away therefrom. As a continuation of the transmission portion 96, a locking portion 98 is formed at the right-hand side of the locking element 92 and grips under the radial extension 54 of the flange 46 or the flange to selectively lock or release the ejector body 40.

Figure 9:
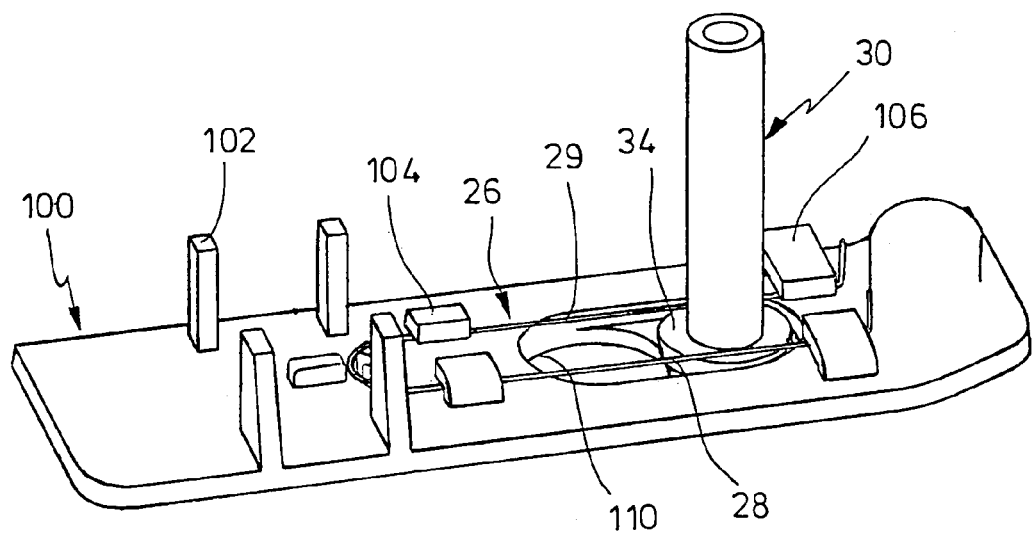
FIG. 9 shows a perspective view of an underside of a lid for the cup shaped body of the foregoing Figures.
Figure 10:
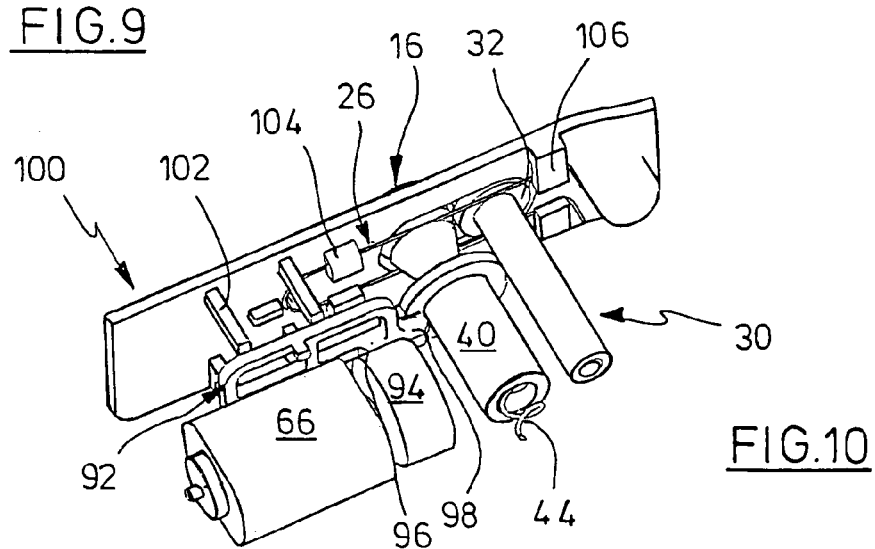
FIG. 10 also shows the underside of the lid of FIG. 9 with the other components of the locking system associated according to FIG. 7.

In FIG. 9, a lid 100 is shown which closes the compartment 12 of the cup shaped body 10 towards the top. The underside of the lid 100 can be recognized in FIGS. 9 and 10. In the area which is left-hand in FIGS. 9 and 10, four legs 102 are formed thereto which when the lid is placed on top of the compartment 12 project into the compartment, which fact is outlined in FIG. 8. Their purpose is to guide the locking element 92 here. What can be seen particularly in FIG. 9 is that the U-shaped wire spring 26 is located on the lid 9, i.e. by means of hook-shaped portions 104, 106 which are arranged in pairs and grip over the legs 28, 29, but allow to expand apart the legs 28, 29. In FIG. 9, the locking body 30 is located at the underside of the lid 100, namely between the legs 28, 29 on one side of the flange 34 and by a surface of the lid 100 on the other side. Thus, FIG. 9 shows a pre-mounted assembly which is placed on top of the compartment 12 after the remaining components are built into the compartment. FIG. 10 shows the entire assembly below the lid 100 with no compartment 12 of FIG. 8.

The lid 100 has a circular hole 110 through which the cylindrical portion 18 of the locking projection 16 extends for a connection to the tank flap, which is not shown. The opening may be circumferentially provided with an annular gasket which provides a seal between the locking projection 16 and the opening 110. When the ejector body 40 is shifted upwards while the tank flap is opened the flange 46 comes to rest against the underside of the lid 100 and the conical extension 48 engages the opening 110 where it interacts with the gasket mounted there to establish a seal also in this condition. The seal mentioned is not shown in FIG. 9.

The invention claimed is:

1. A locking system on a fuel door, comprising:
a locking projection having a lateral locking recess,
the resilient legs in the locking position being adapted to engage the lateral locking recess, an ejector body located in the cup shaped body and configured to be moved along an axis between an outer and an inner position, the axis having the same direction as the axis of the locking projection in a closed position of the fuel door, wherein the ejector body is biased by a first biasing spring towards the outer position and configured to engage the locking projection when the fuel door is in the closed position,
a deflection surface provided in the locking recess, the deflection surface configured to laterally deflect the spring legs when the locking projection and the ejector body are moved against the first biasing spring, and
a locking body located in the cup shaped body and movable between an outer and an inner position parallel to the axis of the ejector body and biased by a second biasing spring towards the inner position, the second biasing spring engaging an outer stop of the cup shaped body, the locking body having a lateral extension configured to engage the spring legs when deflected by the deflection surface into the releasing position,
wherein when in the inner position, a driver portion of the ejector body moves the locking body into the outer position against the second biasing spring when the ejector body is moved into the outer position by the first biasing spring, the spring legs being positioned below the lateral extension in the locking position.

2. The system of claim 1, wherein the locking projection has an outer cylindrical portion and a conical portion of a smaller diameter, the locking recess being located between the portions.

3. The system of claim 2, wherein the locking recess is formed by an annular groove and the deflection surface is formed by an oblique wall of the annular groove.

4. The system of claim 2, wherein the spring legs are compristed of a U-shaped wire spring, the spring legs being preferably approximately parallel in the locking position wherein the legs engage the locking recess, the spring legs being held in expended condition by the locking body in the inner position whereby the locking projection can freely move relative to the spring legs.

5. The system of claim 1, wherein the ejector body includes a sleeve portion which accommodates a coiled first biasing spring.

6. The system of claim 1, wherein the ejector body at the outer end has a flange including a radially extension, the extension being guided by a guiding slot of the cup shaped body.

7. The system of claim 1, wherein the locking element cooperates with the radial extension.

8. The system of claim 1, wherein it is located in a compartment of the cup shaped body the compartment is closed by a lid.

9. The system of claim 8, wherein in the outer position the ejector body engages the lower side of the lid.

10. The system of claim 1, wherein the locking body includes a sleeve portion wherein a coiled second biasing spring is accommodated.

11. The system of claim 8, wherein the second biasing spring is supported by the lid.

12. The system of claim 4, wherein an outer end of the locking body has one of a radial flange and an enlargement, which is engaged by the spring legs in the released position thereof.

13. The system of claim 8, wherein the lid has an opening, a sealing ring being located in the opening and cooperates with the locking projection.

14. The system of claim 13, wherein at an outer end of the ejector body an axially directed conical extension is provided, the conical extension having a surface cooperating with the annular seal in the outer position of the ejector body.

15. The system of claim 8, wherein the U-shaped spring is attached to the lid and the radial extension of the locking body is secured between the spring legs and the lid.

16. The system of claim 1, includes a locking element that is guided parallel to a moving direction of the ejector body and the locking body by guiding elements, the locking element including a locking arm that cooperates with the ejector body, the locking element being moved along the guiding elements by an electric motor.

17. The system of claim 1, includes a locking element that is movably guided transverse to a moving direction of ejector body and locking body in the cup shaped body and driven by an electric motor through transmission elements.

18. The system of claim 17, wherein the electric motor drives a disk having a spiral groove at a front surface thereof, a pin of an elongated locking element engaging the groove while the locking element is guided radially.

19. The system of claim 17, wherein the locking element has a threaded nut portion, and a transmission wheel has an outer thread which cooperates with the threaded nut portion.

\* \* \* \* \*